United States Patent
Finkelshtein et al.

(10) Patent No.: US 9,485,158 B1
(45) Date of Patent: Nov. 1, 2016

(54) METHODS FOR AGGREGATING PER-SESSION STATISTICS ON A CLUSTERED SYSTEM AND DEVICES THEREOF

(71) Applicant: F5 Networks Inc., Seattle, WA (US)

(72) Inventors: Peter Finkelshtein, Kiryat Motzkin (IL); Dmitry Rovniaguin, Rishon Le Zion (IL)

(73) Assignee: F5 Networks, Inc., Seattle, WA (US)

( * ) Notice: Subject to any disclaimer, the term of this patent is extended or adjusted under 35 U.S.C. 154(b) by 184 days.

(21) Appl. No.: 14/534,899

(22) Filed: Nov. 6, 2014

Related U.S. Application Data (60) Provisional application No. 61/901,246, filed on Nov. 7, 2013.

(51) Int. Cl.
*G06F 15/16* (2006.01)
*H04L 12/26* (2006.01)

(52) U.S. Cl.
CPC .................... *H04L 43/062* (2013.01)

(58) Field of Classification Search
USPC ................. 709/224, 217, 221, 223
See application file for complete search history.

(56) References Cited

U.S. PATENT DOCUMENTS

| | | | |
|---|---|---|---|
| 6,374,300 B2 | 4/2002 | Masters | |
| 2004/0165588 A1* | 8/2004 | Pandya | H04L 63/0218 370/389 |
| 2009/0245135 A1* | 10/2009 | Huang | H04L 49/352 370/254 |
| 2009/0245791 A1* | 10/2009 | Thaler | H04L 12/4625 398/45 |
| 2011/0060824 A1* | 3/2011 | Lundstrom | H04L 43/10 709/224 |
| 2013/0219030 A1* | 8/2013 | Szabo | H04L 49/70 709/221 |
| 2014/0169173 A1* | 6/2014 | Naouri | H04L 47/10 370/237 |

OTHER PUBLICATIONS

MacVittie, L., "Cookies, Sessions and Persistence", F5 Networks Inc., F5 White Paper, Jul. 2, 2008, pp. 1-7.

* cited by examiner

*Primary Examiner* — Jude Jean Gilles
(74) *Attorney, Agent, or Firm* — LeClairRyan, a Professional Corporation (57) ABSTRACT

A method, non-transitory computer readable medium and an multi-blade network traffic manager device that assists with aggregating per-session statistics on a clustered system includes receiving a request for a HTTP transaction. Presence of a cookie within the received request is determined. One or more actions is performed based on the determination of the presence of the cookie to prepare for aggregating session statistics within a clustered system. Session statistics information is aggregated upon performing the one or more actions and completing the request for the HTTP transaction.

30 Claims, 4 Drawing Sheets

METHODS FOR AGGREGATING PER-SESSION STATISTICS ON A CLUSTERED SYSTEM AND DEVICES THEREOF

This application claims the benefit of U.S. Provisional Patent Application Ser. No. 61/901,246 filed on Nov. 7, 2013, which is hereby incorporated by reference in its entirety.

FIELD

This technology generally relates to methods and devices for network management and, more particularly, to methods for aggregating per-session statistics on a clustered system and devices thereof.

BACKGROUND

Prior technologies do not provide HTTP session persistence. Accordingly, when a single HTTP session is initiated by a blade in a network traffic manager, other blades within a network traffic manager will not be able to determine if that HTTP session is a new session or a currently active session. As a result, prior technologies lack effective techniques to aggregate statistics related to a HTTP session.

SUMMARY

A method for aggregating session statistics within a clustered system includes receiving by one of a plurality of blades of a multi-blade network traffic management device a request for a HTTP transaction. Presence of a cookie within the received request is determined by the receiving blade of the multi-blade network traffic management device. One or more actions are performed by the receiving blade of the multi-blade network traffic management device, based on the determination of the presence of the cookie to prepare for aggregating session statistics within a clustered system. Session statistics information is aggregated by the receiving blade of the multi-blade network traffic management device upon performing the one or more actions and completing the request for the HTTP transaction.

A non-transitory computer readable medium having stored thereon instructions for aggregating session statistics within a clustered system comprising machine executable code which when executed by at least one processor, causes the processor to perform steps including receiving a request for a HTTP transaction. Presence of a cookie within the received request is determined. One or more actions are performed based on the determination of the presence of the cookie to prepare for aggregating session statistics within a clustered system. Session statistics information is aggregated upon performing the one or more actions and completing the request for the HTTP transaction.

A multi-blade network traffic manager device including at least one of configurable hardware logic configured to be capable of implementing or a processor coupled to a memory and configured to execute programmed instructions stored in the memory for receiving a request for a HTTP transaction. Presence of a cookie within the received request is determined. One or more actions are performed based on the determination of the presence of the cookie to prepare for aggregating session statistics within a clustered system. Session statistics information is aggregated upon performing the one or more actions and completing the request for the HTTP transaction.

This technology provides a number of advantages including providing a method, non-transitory computer readable medium and apparatus that assists with aggregating per-session statistics on a clustered system. The technology disclosed herein provides an accurate report of concurrent sessions as a cumulative metric. Additionally, the technology disclosed herein is able aggregate per-session statistics to determine the total number of currently active sessions and the number of newly created sessions. By only publishing the synchronization table to aggregate per-session statistics, the technology uses less memory space and minimum processing cycles thereby increasing the performance of the multi-blade network traffic management device.

DETAILED DESCRIPTION

Figure 1:
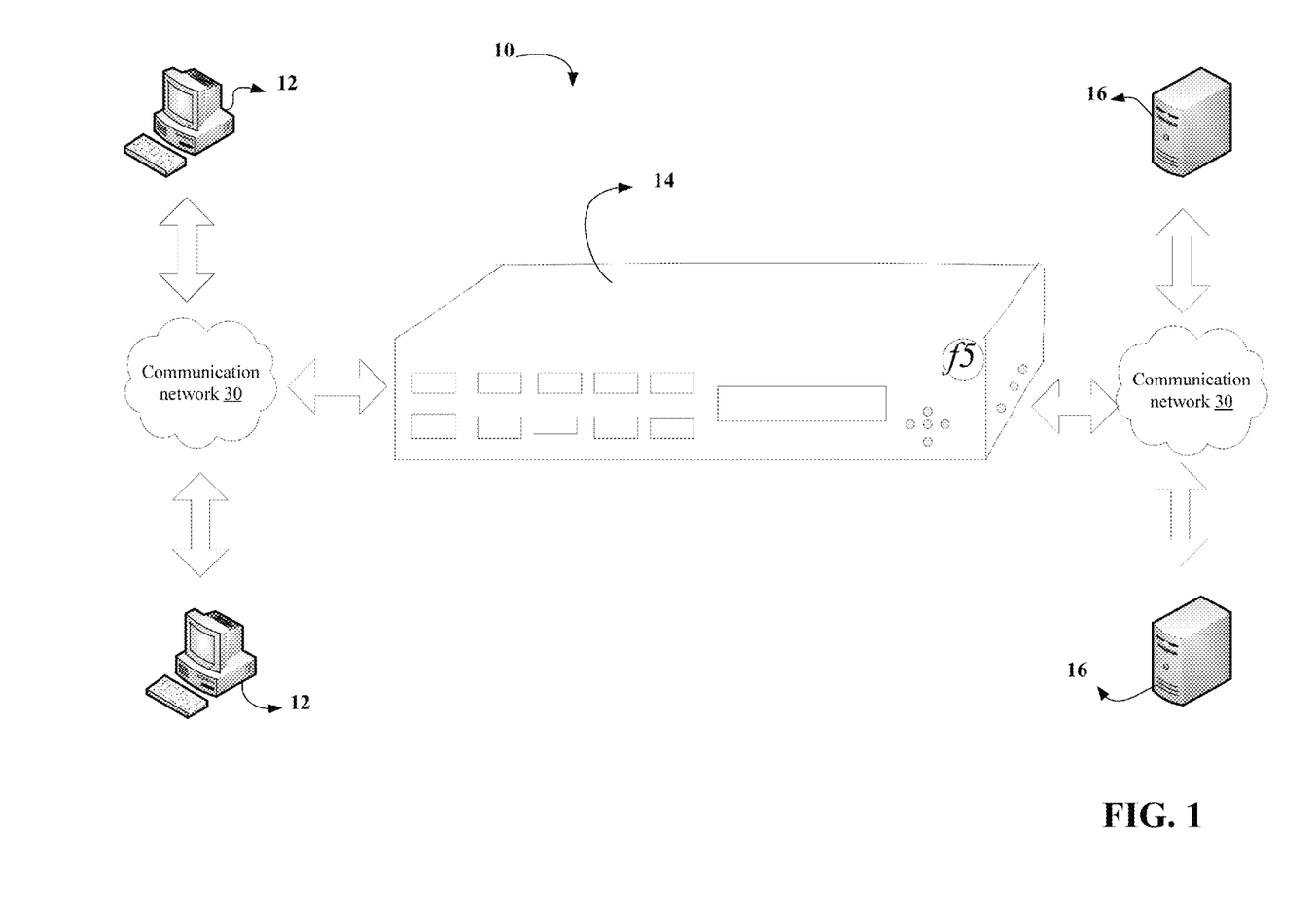
FIG. 1 is an example of a block diagram of an environment including an multi-blade network traffic manager device for aggregating per-session statistics on a clustered system.
Figure 2:
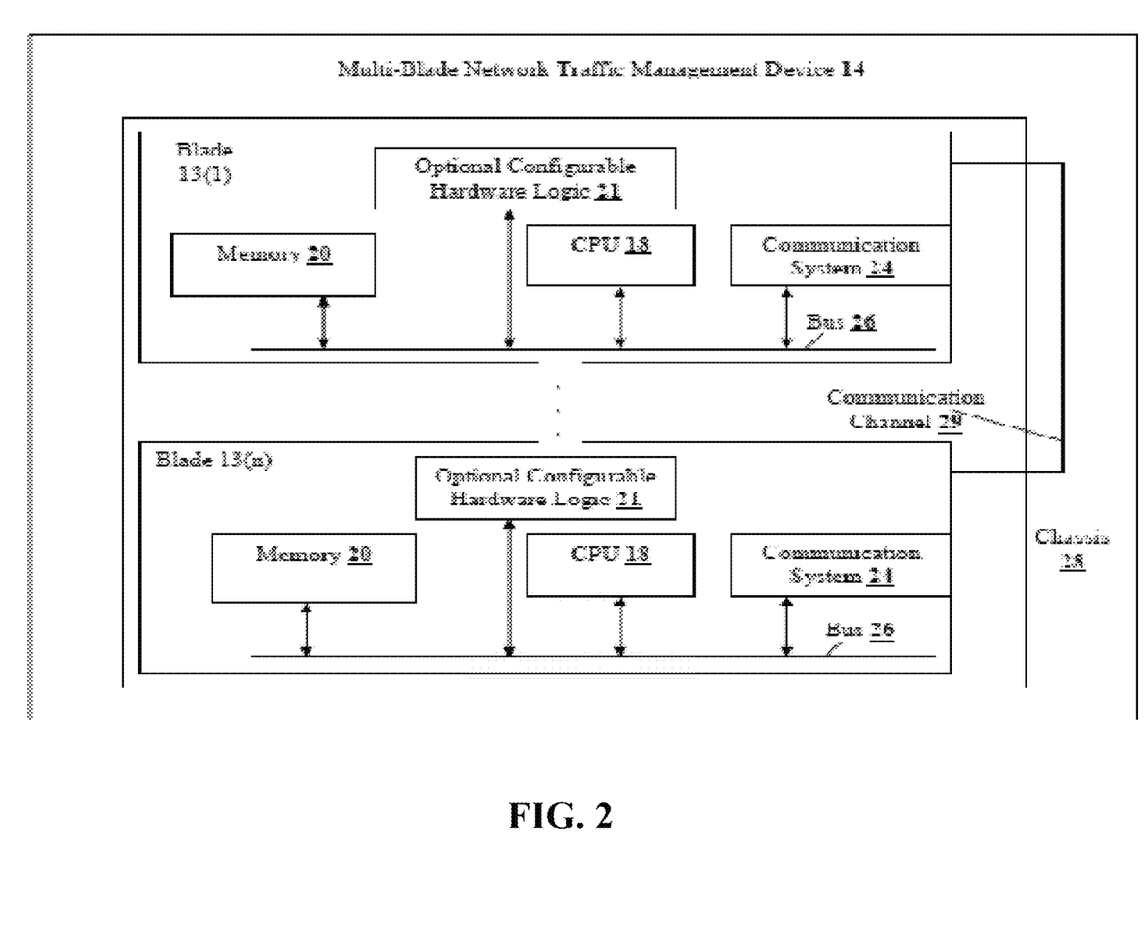
FIG. 2 is an example of a block diagram of an multi-blade network traffic manager device.

An example of a network environment 10 with a multi-blade network traffic manager device 14 for aggregating per-session statistics on a clustered system is illustrated in FIGS. 1 and 2. The exemplary environment 10 includes plurality of client computing devices 12, the multi-blade network traffic manager device 14, and a plurality of servers 16 which are coupled together by communication networks 30, although the environment can include other types and numbers of systems, devices, components, and/or elements and in other topologies and deployments. While not shown, the exemplary environment 10 may include additional network components, such as routers, switches and other devices, which are well known to those of ordinary skill in the art and thus will not be described here. This technology provides a number of advantages including aggregating per-session statistics on a clustered system.

Referring more specifically to FIG. 1, multi-blade network traffic manager device 14 is coupled to the plurality of client computing devices 12 through the communication network 30, although the plurality of client computing devices 12 and multi-blade network traffic manager device 14 may be coupled together via other topologies. Additionally, the multi-blade network traffic manager device 14 is coupled to the plurality of servers 16 through the communication network 30, although the plurality of servers 16 and multi-blade network traffic manager device 14 may be coupled together via other topologies.

The multi-blade network traffic manager device 14 assists with aggregating per-session statistics as illustrated and described with the examples herein, although multi-blade network traffic manager device 14 may perform other types and numbers of functions. As illustrated in FIG. 2, a plurality of blades 13(1)-13(n) attached to a chassis, each of which may perform any number of functions, such as aggregating per-session statistics on a clustered system, optimizing, securing and accelerating the network traffic between the client computing devices and the server computing devices, load balancing with respect to the server computing devices, and/or obtaining, storing, and providing application visibility and reporting statistics. Each blade of the plurality of blades 13(1)-13(n) of the multi-blade network traffic management device 14 includes a processor or central processing unit (CPU) 18, a memory 20, optional configurable hardware logic 21, and a communication system 24 which are coupled together by a bus 26, although the plurality of blades 13(1)-13(n) may comprise other types and numbers of elements in other configurations. In this example, the bus 26 is a hyper-transport bus in this example, although other bus types and links may be used, such as PCI. Additionally, each of the plurality of blades 13(1)-13(n) can communicate using a communication channel 29 disposed between the blades and optionally integral with the chassis 28.

The processor 18 within each blade of the plurality of blades 13(1)-13(n) may execute one or more computer-executable instructions stored in the memory 20 for the methods illustrated and described with reference to the examples herein, although the at least one processor can execute other types and numbers of instructions and perform other types and numbers of operations. The processor 18 may comprise one or more central processing units ("CPUs") or general purpose processors with one or more processing cores, such as AMD®, processor(s), although other types of processor(s) could be used (e.g., Intel®).

Figure 3A:
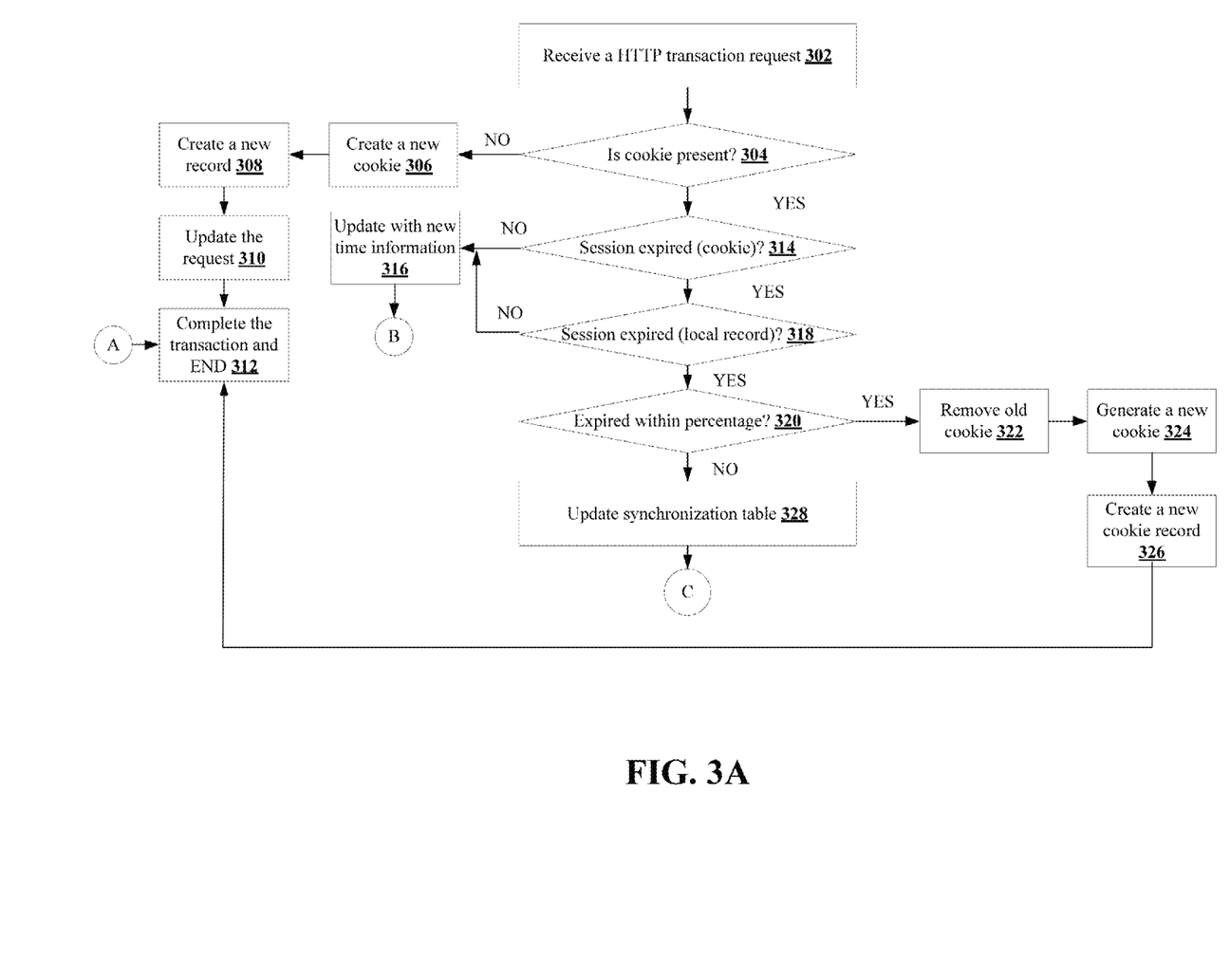
FIGS. 3A-3B is an exemplary flowchart of a method for aggregating per-session statistics on a clustered system.
Figure 3B:
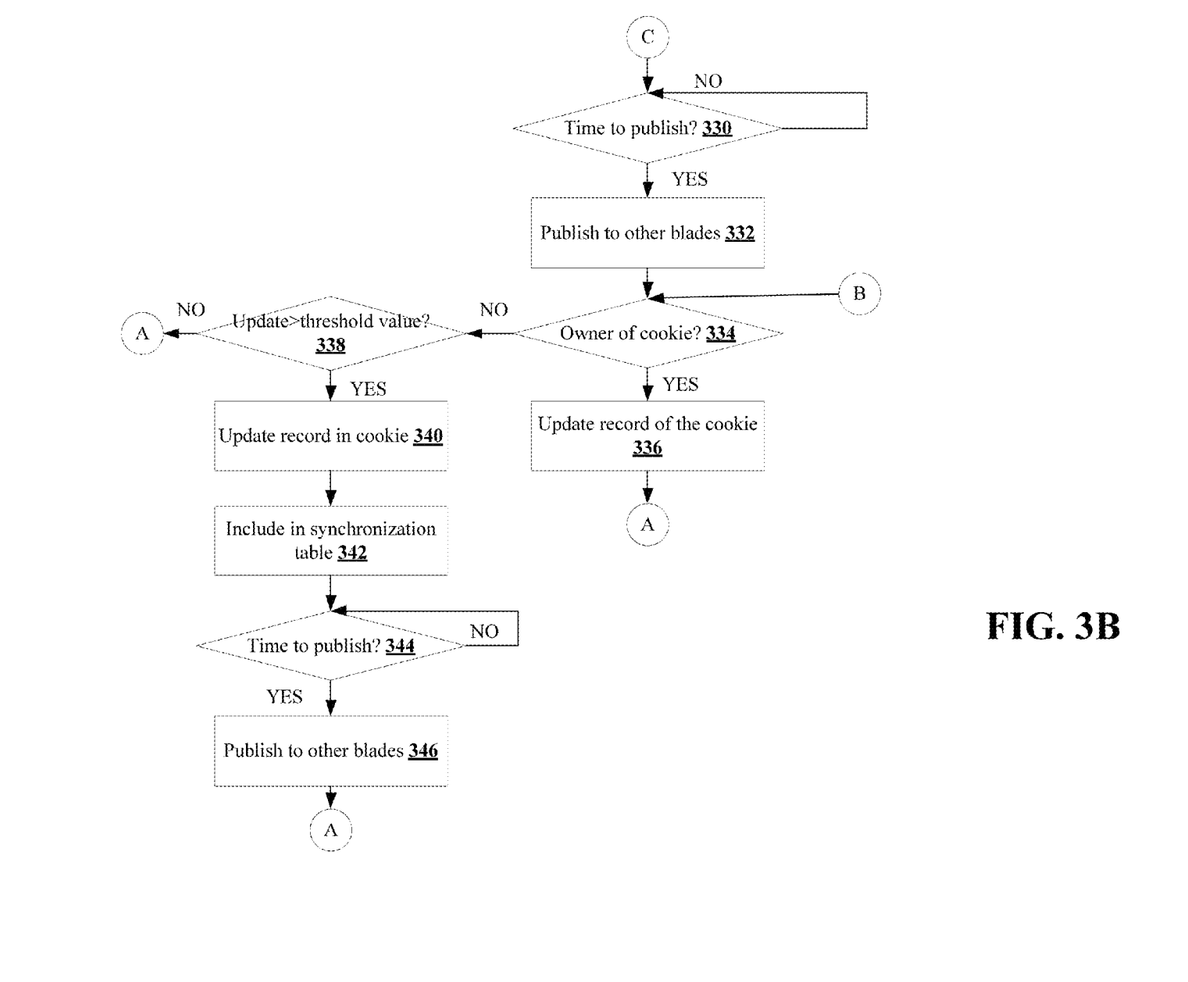

Memory 20 within each blade of the plurality of blades 13(1)-13(n) may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. The memory 20 may store one or more non-transitory computer-readable instructions of this technology as illustrated and described with reference to the examples herein that may be executed by the at least one processor 18. The flow chart shown in FIGS. 3A-3B is representative of example steps or actions of this technology that may be embodied or expressed as one or more non-transitory computer or machine readable instructions stored in memory 20 that may be executed by the processor 18 and/or may be implemented by configured logic in the optional configurable logic 21.

The optional configurable hardware logic 21 in each of the plurality of blades 13(1)-13(n) may comprise specialized hardware configured to implement one or more steps of this technology as illustrated and described with reference to the examples herein. By way of example only, the optional configurable logic hardware device 21 may comprise one or more of field programmable gate arrays ("FPGAs"), field programmable logic devices ("FPLDs"), application specific integrated circuits (ASICs") and/or programmable logic units ("PLUs").

The communication system 24 in each of the plurality of blades 13(1)-13(n) in the multi-blade network traffic manager device 14 is used to operatively couple and communicate between the multi-blade network traffic manager device 14 and the plurality of client computing devices 12 and the plurality of servers 16 which are all coupled together by communication network 30 such as one or more local area networks (LAN) and/or the wide area network (WAN), although other types and numbers of communication networks or systems with other types and numbers of connections and configurations to other devices and elements. By way of example only, the communication network such as local area networks (LAN) and the wide area network (WAN) can use TCP/IP over Ethernet and industry-standard protocols, including NFS, CIFS, SOAP, XML, LDAP, and SNMP, although other types and numbers of communication networks, can be used. In this example, the bus 26 is a hyper-transport bus in this example, although other bus types and links may be used, such as PCI.

Each of the plurality of client computing devices 12, include a central processing unit (CPU) or processor, a memory, input device, display device, optional configurable logic device and a communication system, which are coupled together by a bus or other link. Each of the plurality of client computing devices 12, in this example, may run interface applications, such as Web browsers, that may provide an interface to make queries for and send data to make requests for and send content and/or data to different server based applications at the plurality of servers 16 via the communication network 30, although other types of application may also run on each of the plurality of client computing devices 12.

Each of the plurality of servers 16 include a central processing unit (CPU) or processor, a memory, and a communication system, which are coupled together by a bus or other link, although other numbers and types of network devices could be used. Generally, the plurality of servers 16 process requests received from requesting client computing devices via the communication network 30 according to the HTTP-based application RFC protocol or the CIFS or NFS protocol in this example, but the principles discussed herein are not limited to this example and can include other application protocols. A series of applications may run on the plurality external resource servers 16 that allow the transmission of data, such as a data file or metadata, requested by the plurality client computing devices 12 or the multi-blade network traffic manager device 14. The plurality of servers 16 may provide data or receive data in response to requests directed toward the respective applications on the plurality of servers 16 from the plurality of client computing devices 12 or the multi-blade network traffic manager device 14. It is to be understood that the plurality of servers 16 may be hardware or software or may represent a system with multiple external resource servers, which may include internal or external networks. In this example the plurality of servers 16 may be any version of Microsoft® IIS servers or Apache® servers, although other types of servers may be used.

Although an exemplary environment 10 with the plurality of client computing devices 12, the multi-blade network traffic manager device 14, and the plurality of servers 16, communication networks 30 are described and illustrated herein, other types and numbers of systems, devices, blades, components, and elements in other topologies can be used. It is to be understood that the systems of the examples described herein are for exemplary purposes, as many variations of the specific hardware and software used to implement the examples are possible, as will be appreciated by those skilled in the relevant art(s).

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein. An example of a method for aggregating per-session statistics on a clustered will now be described herein with reference to FIGS. 1-3B.

Referring more specifically to FIGS. 3A-3B, the exemplary method begins at step 302 where one of the blades in the multi-blade network traffic management device 14 receives a request for an HTTP transaction from one of the plurality of client computing devices 12, although the multi-blade network traffic management device 14 can receive other types of request from other devices.

Next in step 304, the receiving blade 13(1) of the multi-blade network traffic management device 14 determines if there is a cookie present in the received HTTP request. If the receiving blade 13(1) in the multi-blade network traffic management device 14 determines there is no cookie, then the No branch is taken to step 306.

In step 306, the receiving blade 13(1) in the multi-blade network traffic management device 14 creates a new cookie for the received HTTP request from the requesting one of the plurality of client computing devices 12. Once the receiving blade 13(1) in the multi-blade network traffic management device 14 creates the new cookie, the receiving blade 13(1) of the multi-blade network traffic management device 14 becomes the owner blade of the created cookie. Additionally, in this example, since the new cookie is created, the receiving blade 13(1) (which is the owner blade of the cookie) sets the current time as the session start time indicating initiation of a new session.

Next in step 308, the receiving blade 13(1) which is the owner blade in the multi-blade network traffic management device 14 creates a new local record to include the information associated with the created cookie in memory 20 (of the receiving blade 13(1)) indicating the creation of the new cookie, although the receiving blade 13(1) can store the information at memory locations. By way of example only, the cookie information includes information such as global session identification number, owner blade number, owner timeout value, global timeout value, local session identification number and session start time, although local record information can include other types or amounts of information. In this example, timeout information represent period of time seen by owner or other blade since the session creation.

Next in step 310, the receiving blade 13(1) (owner blade) in the multi-blade network traffic management device 14 updates the traffic transaction (request) by including the created cookie in transaction HTTP response and the exemplary flow proceeds to step 312 where the receiving blade 13(1) of the multi-blade network traffic management device 14 completes the requested HTTP transaction.

However, back in step 304, if the receiving blade 13(1) of the multi-blade network traffic management device 14 determines there is a cookie present in the received HTTP request, then the Yes branch is taken to step 314.

In step 314, then the receiving blade 13(1) of the multi-blade network traffic management device 14 determines if the session associated with the cookie has expired by identifying the timeout value present in the received cookie. If the receiving blade 13(1) of the multi-blade network traffic management device 14 determines that the session associated with the cookie has not expired based on the timeout value present in the received cookie, then the No branch is taken to step 316.

In step 316, the receiving blade 13(1) of the multi-blade network traffic management device 14 records/updates the locally stored cookie information record with a new time information (the new time is the time at which the receiving blade 13(1) received the request).

However, back in step 314, if the receiving blade 13(1) of the multi-blade network traffic management device 14 determines that the session associated with the cookie has expired based on the timeout value present within the received cookie, then the Yes branch is taken to step 318.

In step 318, the receiving blade 13(1) of the multi-blade network traffic management device 14 determines if the cookie information which is stored locally within the memory 20 of the receiving blade 13(1) also indicates that the session has expired. By way of example only, the receiving blade 13(1) may use the current time of received request and the time stored within the cookie and locally stored cookie information to determine if the session is expired, although the receiving blade 13(1) can use other techniques to determine if the session associated with the cookie has expired.

Accordingly, if the receiving blade 13(1) of the multi-blade network traffic management device 14 determines that the cookie information which is stored locally within the memory 20 of the receiving blade 13(1) indicates that the session has not expired, then the No branch is taken back to step 316 which was previously illustrated above. By way of example only, the receiving blade 13(1) of the multi-blade network traffic management device 14 determines that the session has not expired based on the locally stored cookie information when cookie timeout value indicates that the session is still active, although the receiving blade 13(1) can use other techniques to make the determination.

However back in step 318, if the receiving blade 13(1) of the multi-blade network traffic management device 14 determines that both information present within the cookie (cookie timeout) and the locally stored cookie information indicates that the session has expired, then the Yes branch is taken to step 320.

In step 320, the receiving blade 13(1) of the multi-blade network traffic management device 14 determines if the session has expired within a certain threshold percentage of time, by way of example only five percent, of the cookie maximum life time, based on information present in the cookie, although the percentage value can include values between zero to hundred. Alternatively in another example, the receiving blade 13(1) can also determine if the session has expired within the certain threshold percentage of time based on the locally stored cookie information. Accordingly, if the receiving blade 13(1) of the multi-blade network traffic management device 14 determines that the session has expired above the threshold percentage of cookie maximum lifetime based on the information present in the locally stored cookie information timeout value, then then the Yes branch is taken to step 322.

In step 322, the receiving blade 13(1) of the multi-blade network traffic management device 14 removes the expired cookie from the received request and deletes the locally stored cookie information in memory 20 of the receiving blade 13(1).

Next in step 324, the receiving blade 13(1) of the multi-blade network traffic management device 14 generates a new cookie using the technique illustrated in step 306 and the exemplary flow proceeds to step 326.

In step 326, the receiving blade 13(1) of the multi-blade network traffic management device 14 creates a new cookie record locally to store the information associated with the new cookie. Next, the exemplary flow proceeds back to step 312 wherein the receiving blade 13(1) replaces the expired cookie with the new generated cookie and completes the requested HTTP transaction.

However, back in step 320, if the receiving blade 13(1) of the multi-blade network traffic management device 14 determines that the session has expired within the threshold percentage (for example five percent) of cookie maximum lifetime based on the cookie information or the locally stored cookie information, then the No branch is taken to step 328.

In step 328, the receiving blade 13(1) of the multi-blade network traffic management device 14 updates the session record in synchronization table stored within the memory 20 of the receiving blade 13(1) indicating that the cookie present within the received HTTP request has expired within the threshold percentage has pending transaction, although the receiving blade can perform other actions or update other records. Additionally, the receiving blade 13(1) of the multi-blade network traffic management device 14 can also notify the other blades of the plurality of blades 13(1)-13(n) that the expired session (which might be expired on the other blades) has a pending transaction and the exemplary flow proceeds to step 330 which will be further illustrated using FIG. 3B.

In step 330 illustrated in FIG. 3B, the receiving blade 13(1) of the multi-blade network traffic management device 14 determines if it is time to publish the synchronization table. In this example, the publish time can be pre-defined time, such as every five minutes by way of example only, although the blades within the network traffic management device can publish the synchronization table information based on a request from other blades of the plurality of blades 13(1)-13(n) within the network traffic management device 14. Accordingly, if the receiving blade 13(1) of the multi-blade network traffic management device 14 determines that it is not the time to publish the synchronization table, then the No branch is taken back to step 330 where the receiving blade 13(1) waits until it is time to publish the synchronization table.

However, in step 330 when the receiving blade 13(1) of the multi-blade network traffic management device 14 determines that it is the time to publish the synchronization table, then the Yes branch is taken to step 332.

In step 332, the receiving blade 13(1) of the multi-blade network traffic management device 14 publishes only the synchronization table to the other blades of the plurality of blades 13(1)-13(n) within the network traffic management device 14 via the communication channel 29, although the receiving blade can publish using other techniques.

Next in step 334, the receiving blade 13(1) of the multi-blade network traffic management device 14 proceeds to determine if it is an owner of the session associated with the received cookie. In this example, the receiving blade 13(1) compares an owner blade identification number within the received cookie to a blade identification number to determine if it is the own of the session, although the receiving blade 13(1) can determine the ownership of the cookie based on the information present in the received cookie. Accordingly, when the receiving blade 13(1) determines that it is the owner of the session associated with the cookie, then the Yes branch is taken to step 336.

In step 336, the receiving blade 13(1) of the multi-blade network traffic management device 14 records or updates cookie owner timeout value and local record owner timeout value with a new time information, where the new time information is the time at which the received blade 13(1) received the request and the exemplary flow proceeds to step 312 where the receiving blade 13(1) completes the requested transaction and the exemplary process ends. Additionally the receiving blade 13(1) (which is also session owner blade) includes the updated cookie in the next response for the current session. Alternatively, the receiving blade 13(1) (which is also the owner blade) may include the updated cookie in the next request for the current session, when the timeout period of the cookie is less than half of the pre-defined lifetime of a cookie.

However back in step 334, when the receiving blade 13(1) determines that it is not the owner blade of the cookie received in the HTTP request, then the No branch is taken to step 338.

In step 338, the receiving blade 13(1) of the multi-blade network traffic management device 14 determines if the session associated with the cookie received in the HTTP request has not expired and if the timeout value in the record locally stored (within the receiving blade) of the cookie has not been updated for more than a threshold value of the session lifetime. In this example, the threshold value is two thirds of the session lifetime, although the threshold value can be other fractions or integers. Accordingly, when the receiving blade 13(1) (which is not the owner blade) determines that the session has not expired and when the timeout value in the record locally stored (within the receiving blade) of the cookie has been updated for less than a threshold value of the session lifetime (indicating that the locally stored record was recently updated), then the No branch is taken back to step 312 where the receiving blade 13(1) completes the transaction and the exemplary process ends. Additionally the receiving blade includes the updated cookie in the next response for the current session.

However, back in step 338, when the receiving blade 13(1) in the multi-blade network traffic management device 14 determines that the session has not expired and the timeout value in the record locally stored (within the receiving blade) of the cookie has not been updated for more than a threshold value of the session lifetime, then the Yes branch is taken to step 340.

In step 340, the receiving blade 13(1) (which is not an owner blade) updates the timeout value in the received cookie.

Next in step 342, the receiving blade 13(1) of the multi-blade network traffic management device 14 includes the information associated with the cookie in a synchronization table within the memory 20 so that the receiving blade can later notify other blades by publishing the synchronization table. As previously illustrated, the information associated with the cookie relates to the session identification number, session start time, owner blade number, timeout by owner value and timeout by others blades value, although the receiving blade can store other information associated with the cookie in the synchronization table.

Next in step 344, the receiving blade 13(1) determines if it is time to publish the synchronization table using the technique previously illustrated in step 330. Accordingly, if the receiving blade 13(1) determines that it is not the time to publish, then the No branch is taken back to step 344 where the receiving blade 13(1) waits until it is time to publish.

However, when the receiving blade 13(1) determines that it is time to publish the synchronization table, then the Yes branch is taken to step 346.

In step 346, the receiving blade 13(1) of the multi-blade network traffic management device 14 publishes only the synchronization table to the other blades within the network traffic management device 14 via the communication channel 29 using technique previously illustrated in step 332 and the exemplary flow proceeds back to step 312 where the receiving blade 13(1) completes the requested transaction. Additionally, at the publish time, similar to the receiving blade 13(1), other blades of the plurality of blades 13(1)-13(n) within the network traffic management device 14 also publish their synchronization tables.

By publishing only the synchronization table to other blades within the network traffic management device, remaining blades, including the owner blade of the received cookie, are made aware that the session associated with the cookie is still active. Accordingly, remaining blades within the network traffic management device can synchronize and update their synchronization table or owner cookie table information.

Additionally, the receiving blade only report statistics when the receiving blade is the owner of the session, although the receiving blade can publish other information. This allows correct report of concurrent sessions as a cumulative metric. In this example, each blade uses others blades published synchronization tables information to update its local session records. Using these techniques, the technology disclosed herein is able aggregate per-session statics to determine the total number of currently active sessions (based on the information from the published synchronization table) and the number of newly created sessions (based on the technique illustrated in steps 306-312). Using this information, the multi-blade network traffic management computing device is able to generate a report to indicate the per-session statistics.

Having thus described the basic concept of the disclosed technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the disclosed technology. Additionally, the recited order of processing elements or sequences, or the use of numbers, letters, or other designations therefore, is not intended to limit the claimed processes to any order except as may be specified in the claims. Accordingly, the disclosed technology is limited only by the following claims and equivalents thereto.

What is claimed is:

1. A method for aggregating session statistics within a clustered system, the method comprising:
   receiving, by one of a plurality of blades of a multi-blade network traffic management device, a request for a HTTP transaction;
   determining, by the receiving blade of the multi-blade network traffic management device, when a cookie is present within the received request;
   performing, by the receiving blade of the multi-blade network traffic management device, one or more actions based on the determination of the presence of the cookie to prepare for aggregating session statistics within a clustered system; and
   aggregating, by the receiving blade of the multi-blade network traffic management device, session statistics information upon performing the one or more actions and completing the request for the HTTP transaction.

2. The method as set forth in claim 1 wherein the performing further comprises:
   creating, by the receiving blade of the multi-blade network traffic management device, another cookie when the determination indicates the cookie is not present within the received request;
   configuring, by the receiving blade of the multi-blade network traffic management device, the created cookie with cookie information; and
   storing, by the receiving blade of the multi-blade network traffic management device, the cookie information in an owner cookie table.

3. The method as set forth in claim 1 wherein the performing further comprises:
   determining, by the receiving blade of the multi-blade network traffic management device, when a session associated with the received cookie is expired by comparing cookie timeout information present within the received cookie with a current time of receiving the cookie when the determination indicates the cookie is present in the received request; and
   determining, by the receiving blade of the multi-blade network traffic management device, when the session associated with the cookie is expired by comparing timeout information within a local record with the current time of receiving the cookie when the cookie timeout information is compared with the current time of the receiving the cookie.

4. The method as set forth in claim 3 further comprising:
   determining, by the receiving blade of the multi-blade network traffic management device, when the session associated with the received cookie expired before a threshold percentage of a session lifetime when the session associated with the received cookie is determined to have expired based on both comparisons of cookie timeout information present within the received cookie and timeout information within the local record with the current time of receiving the cookie; and
   updating, by the receiving blade of the multi-blade network traffic management device, a synchronization table with the session expiration information when the session associated with the received cookie is determined to have expired before the threshold percentage of a session lifetime.

5. The method as set forth in claim 4 wherein the determining further comprises:
   removing, by the receiving blade of the multi-blade network traffic management device, the session information from a local memory comprising a cookie table when the session associated with the received cookie is not determined to have expired before the threshold percentage of a session lifetime;
   creating, by the receiving blade of the multi-blade network traffic management device, a new cookie upon removing the session information from the local memory;

configuring, by the receiving blade of the multi-blade network traffic management device, the created cookie with updated cookie information; and storing, by the receiving blade of the multi-blade network traffic management device, the updated cookie information in the local memory comprising the cookie table.

6. The method as set forth in claim 3 wherein the determining further comprises updating, by the receiving blade of the multi-blade network traffic management device, the timeout information within the local record with new timeout information when the session associated with the received cookie is not determined to have expired based on both comparisons of cookie timeout information present within the received cookie and timeout information within the local record with the current time of receiving the cookie.

7. The method as set forth in claim 3 further comprising:
determining, by the receiving blade of the multi-blade network traffic management device, when receiving blade is an owner blade of the session associated with the received cookie, by comparing an owner blade identification number within the received cookie to a blade identification number; and
updating, by the receiving blade of the multi-blade network traffic management device, the owner timeout value information in the cookie and owner timeout information value in the local cookie table when the receiving blade is determined to the owner blade of the session associated with the received cookie.

8. The method as set forth in claim 7 wherein the determining further comprises:
determining, by the receiving blade of the multi-blade network traffic management device, when the received cookie was last updated within a threshold value of the session lifetime period when the receiving blade is not determined to be owner blade; and
adding, by the receiving blade of the multi-blade network traffic management device, the updated cookie into the received request for HTTP transaction when the received cookie is determined not to have been last updated within the threshold value of the session lifetime period.

9. The method as set forth in claim 8 wherein the determining further comprises:
updating, by the receiving blade of the multi-blade network traffic management device, an extended timeout values for an owner timeout and a global timeout in the received cookie and in the local cookie table when the received cookie is determined to have not been updated within the threshold value of the session lifetime period;
creating, by the receiving blade of the multi-blade network traffic management device, a new record associated with the updated the extended timeout values for the owner timeout and the global timeout in a synchronization table; and
publishing, by the receiving blade of the multi-blade network traffic management device, the synchronization table to one or more remaining blades within the network traffic management device.

10. The method as set forth in claim 9 further comprising:
determining, by the receiving blade of the multi-blade network traffic management device, a number of active sessions based on the published synchronization table; and generating, by the receiving blade of the multi-blade network traffic management device, a report indicating the determined number of active sessions.

11. A non-transitory computer readable medium having stored thereon instructions for aggregating session statistics within a clustered system comprising machine executable code which when executed by at least one processor, causes the processor to perform steps comprising:
receiving a request for a HTTP transaction;
determining when a cookie is present within the received request;
performing one or more actions based on the determination of the presence of the cookie to prepare for aggregating session statistics within a clustered system; and
aggregating session statistics information upon performing the one or more actions and completing the request for the HTTP transaction.

12. The medium as set forth in claim 11 wherein the performing further comprises:
creating another cookie when the determination indicates the cookie is not present within the received request;
configuring the created cookie with cookie information; and
storing the cookie information in an owner cookie table.

13. The medium as set forth in claim 11 wherein the performing further comprises:
determining when a session associated with the received cookie is expired by comparing cookie timeout information present within the received cookie with a current time of receiving the cookie when the determination indicates the cookie is present in the received request; and
determining when the session associated with the cookie is expired by comparing timeout information within a local record with the current time of receiving the cookie when the cookie timeout information is compared with the current time of the receiving the cookie.

14. The medium as set forth in claim 13 further comprising:
determining when the session associated with the received cookie expired before a threshold percentage of a session lifetime when the session associated with the received cookie is determined to have expired based on both comparisons of cookie timeout information present within the received cookie and timeout information within the local record with the current time of receiving the cookie; and
updating a synchronization table with the session expiration information when the session associated with the received cookie is determined to have expired before the threshold percentage of a session lifetime.

15. The medium as set forth in claim 14 wherein the determining further comprises:
removing the session information from a local memory comprising a cookie table when the session associated with the received cookie is not determined to have expired before the threshold percentage of a session lifetime;
creating a new cookie upon removing the session information from the local memory;
configuring the created cookie with updated cookie information; and
storing the updated cookie information in the local memory comprising the cookie table.

16. The medium as set forth in claim 13 wherein the determining further comprises updating the timeout information within the local record with new timeout information when the session associated with the received cookie is not determined to have expired based on both comparisons of cookie timeout information present within the received cookie and timeout information within the local record with the current time of receiving the cookie.

17. The medium as set forth in claim 13 further comprising:
   determining when a receiving blade is an owner blade of the session associated with the received cookie, by comparing an owner blade identification number within the received cookie to a blade identification number; and
   updating the owner timeout value information in the cookie and owner timeout information value in the local cookie table when the receiving blade is determined to the owner of the session associated with the received cookie.

18. The medium as set forth in claim 17 wherein the determining further comprises:
   determining when the received cookie was last updated within a threshold value of the session lifetime period when the receiving blade is not determined to be the owner blade; and
   adding the updated cookie into the received request for HTTP transaction when the received cookie is determined not to have been last updated within the threshold value of the session lifetime period.

19. The medium as set forth in claim 18 wherein the determining further comprises:
   updating an extended timeout values for an owner timeout and a global timeout in the received cookie and in the local cookie table when the received cookie is determined to have not been updated within the threshold value of the session lifetime period;
   creating a new record associated with the updated the extended timeout values for the owner timeout and the global timeout in a synchronization table; and
   publishing the synchronization table to one or more remaining blades within the network traffic management device.

20. The medium as set forth in claim 19 further comprising:
   determining a number of active sessions based on the published synchronization table; and
   generating a report indicating the determined number of active sessions.

21. A multi-blade network traffic management device comprising:
   a plurality of network traffic management blades, wherein each of the blades comprises at least one processor coupled to at least one of a memory or configurable logic wherein at least one of the configurable logic is configured to implement or the processor is configured to execute programmed instructions stored in the memory comprising:
   receiving a request for a HTTP transaction;
   determining when a cookie is present within the received request;
   performing one or more actions based on the determination of the presence of the cookie to prepare for aggregating session statistics within a clustered system; and
   aggregating session statistics information upon performing the one or more actions and completing the request for the HTTP transaction.

22. The device as set forth in claim 21 wherein at least one of the configurable logic further configured to implement or the processor further configured to execute programmed instructions stored in the memory for the performing further comprises:
   creating another cookie when the determination indicates the cookie is not present within the received request;
   configuring the created cookie with cookie information; and
   storing the cookie information in an owner cookie table.

23. The device as set forth in claim 21 wherein at least one of the configurable logic further configured to implement or the processor further configured to execute programmed instructions stored in the memory for the performing further comprises:
   determining when a session associated with the received cookie is expired by comparing cookie timeout information present within the received cookie with a current time of receiving the cookie when the determination indicates the cookie is present in the received request; and
   determining when the session associated with the cookie is expired by comparing timeout information within a local record with the current time of receiving the cookie when the cookie timeout information is compared with the current time of the receiving the cookie.

24. The device as set forth in claim 21 wherein at least one of the configurable logic further configured to implement or the processor further configured to execute programmed instructions stored in the memory further comprising:
   determining when the current time of received request is equal to both the last time recorded by the owner blade and a last time recorded by a non-owner blade within the received cookie when the receiving blade is not determined to the owner of the cookie in the received request;
   determining when the current time of the received request is equal to the last time recorded by the owner blade within the received cookie when the current time of received request is determined not equal to both the last time recorded by the owner blade and the last time recorded by the non-owner blade within the received cookie; and
   removing the session information associated with the cookie from a synchronization table stored within the receiving blade when the current time of the received request is equal to the last time recorded by the owner blade within the received cookie.

25. The device as set forth in claim 24 wherein at least one of the configurable logic further configured to implement or the processor further configured to execute programmed instructions stored in the memory further comprising:
   determining when the session associated with the received cookie expired before a threshold percentage of a session lifetime when the session associated with the received cookie is determined to have expired based on both comparisons of cookie timeout information present within the received cookie and timeout information within the local record with the current time of receiving the cookie; and
   updating a synchronization table with the session expiration information when the session associated with the received cookie is determined to have expired before the threshold percentage of a session lifetime.

26. The device as set forth in claim 25 wherein at least one of the configurable logic further configured to implement or the processor further configured to execute programmed instructions stored in the memory for the determining further comprises:

removing the session information from a local memory comprising a cookie table when the session associated with the received cookie is not determined to have expired before the threshold percentage of a session lifetime;

creating a new cookie upon removing the session information from the local memory;

configuring the created cookie with updated cookie information; and     storing the updated cookie information in the local memory comprising the cookie table.

27. The device as set forth in claim 24 wherein at least one of the configurable logic further configured to implement or the processor further configured to execute programmed instructions stored in the memory for the determining further comprises updating the timeout information within the local record with new timeout information when the session associated with the received cookie is not determined to have expired based on both comparisons of cookie timeout information present within the received cookie and timeout information within the local record with the current time of receiving the cookie.

28. The device as set forth in claim 23 wherein at least one of the configurable logic further configured to implement or the processor further configured to execute programmed instructions stored in the memory further comprising:

determining when a receiving blade is an owner blade of the session associated with the received cookie, by comparing an owner blade identification number within the received cookie to a blade identification number; and     updating the owner timeout value information in the cookie and owner timeout information value in the local cookie table when the receiving blade is determined to the owner blade of the session associated with the received cookie.

29. The device as set forth in claim 23 wherein at least one of the configurable logic further configured to implement or the processor further configured to execute programmed instructions stored in the memory for the determining further comprises:

updating an extended timeout values for an owner timeout and a global timeout in the received cookie and in the local cookie table when the received cookie is determined to have not been updated within the threshold value of the session lifetime period;

creating a new record associated with the updated the extended timeout values for the owner timeout and the global timeout in a synchronization table; and     publishing the synchronization table to one or more remaining blades within the network traffic management device.

30. The device as set forth in claim 29 wherein at least one of the configurable logic further configured to implement or the processor further configured to execute programmed instructions stored in the memory further comprising:

determining a number of active sessions based on the published synchronization table; and     generating a report indicating the determined number of active sessions.

\* \* \* \* \*